United States Patent [19]

Armor et al.

[11] Patent Number: 4,465,947
[45] Date of Patent: Aug. 14, 1984

[54] FAN DIFFUSER AND COLLECTOR COMBINATION FOR COOLING SYSTEMS IN DYNAMOELECTRIC MACHINES

[75] Inventors: Anthony F. Armor, Sunnyvale, Calif.; Allan C. Shartrand, Scotia, N.Y.; David A. Noel, Old Orchard, Me.; Kathryn M. Rominger, Clifton Park, N.Y.

[73] Assignee: General Electric Company, Schenectady, N.Y.

[21] Appl. No.: 513,174

[22] Filed: Jul. 13, 1983

[51] Int. Cl.$^3$ .............................................. H02K 9/00
[52] U.S. Cl. ...................................... 310/59; 310/55; 310/62
[58] Field of Search ....................... 310/52, 53, 55, 58, 310/59, 60 R, 60 A, 61, 62, 63, 64, 65

[56] References Cited

U.S. PATENT DOCUMENTS

| | | | |
|---|---|---|---|
| 1,269,537 | 6/1918 | Holcombe | 310/58 |
| 1,594,058 | 7/1926 | Freiburghouse | 310/63 |
| 2,663,808 | 12/1953 | Rosenberg | 310/55 |
| 2,873,393 | 2/1959 | Baudry | 310/55 |
| 3,348,081 | 10/1967 | Willyoung | 310/55 |
| 3,739,208 | 6/1973 | Shartrand | 310/58 |
| 3,969,643 | 7/1976 | Säpper | 310/58 |

OTHER PUBLICATIONS

Drawing illustrating Direct-Cooled Rotor and Armature Windings for Philo #6, Ohio Power Company, (1952).

Skoda Review #4 (1976), 500 MW Turbo-Alternator by M. Homola, J. Hlavac and R. Vorisek.

Primary Examiner—R. Skudy
Attorney, Agent, or Firm—John F. Ahern; Paul Checkovich

[57] ABSTRACT

In a dynamoelectric machine, a fan diffuser and collector combination is part of the cooling system of the machine. The fan diffuser and collector is located in the annular chamber defined by the inner and outer end plate shields at one end of the machine. The fan diffuser includes a disk disposed in the radially inner portion of the annular chamber. An inboard surface of the disk is parallel to the adjacent surface of one of the shields. Both surfaces define a diffuser channel which receives substantially all of the gas flow expelled by a fan radially coextensive with the annular chamber. The disk is mounted on the other shield but has an outboard surface spaced away from that latter shield. The disk is foreshortened with respect to a frame wrapper which surrounds the stator and rotor of the dynamoelectric machine thereby forming a collector.

13 Claims, 9 Drawing Figures

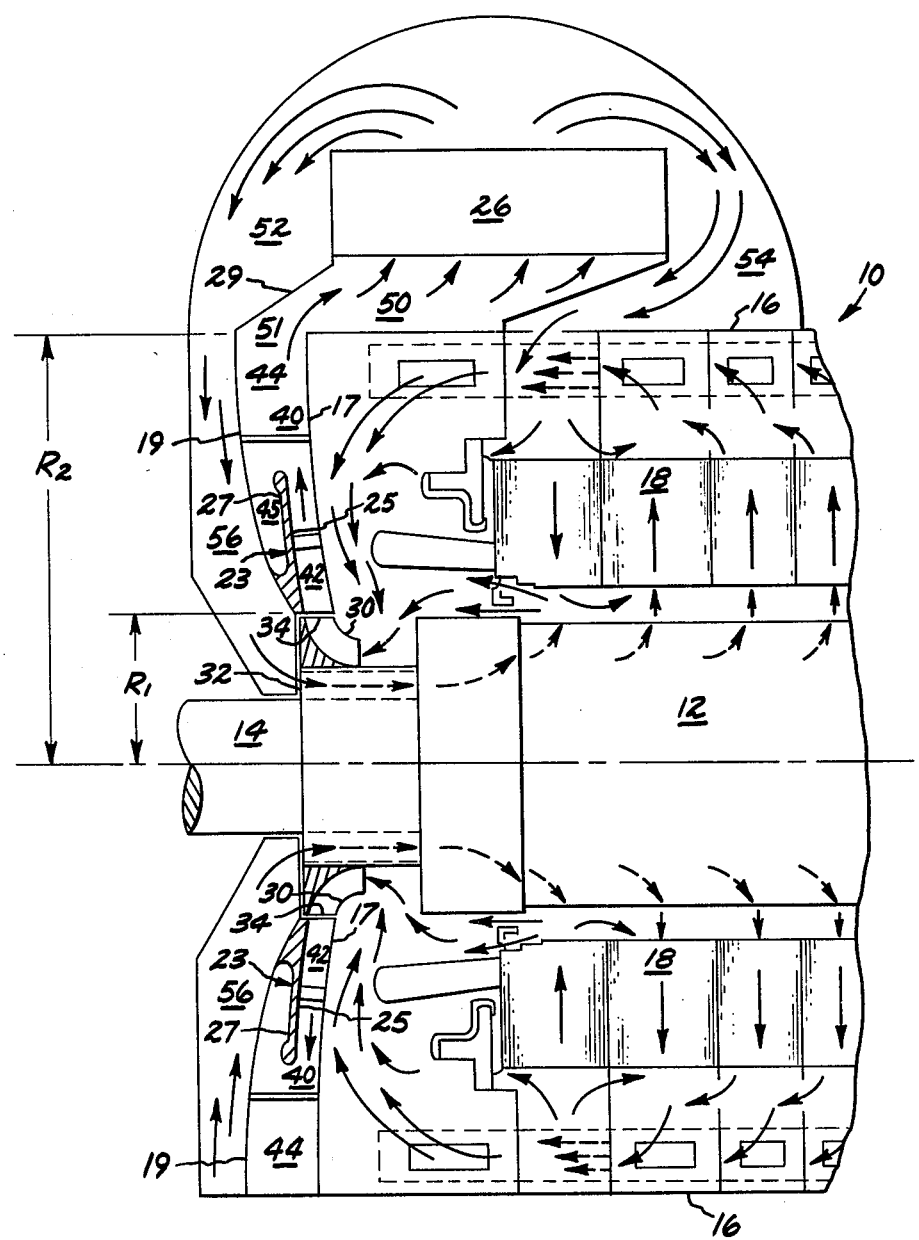

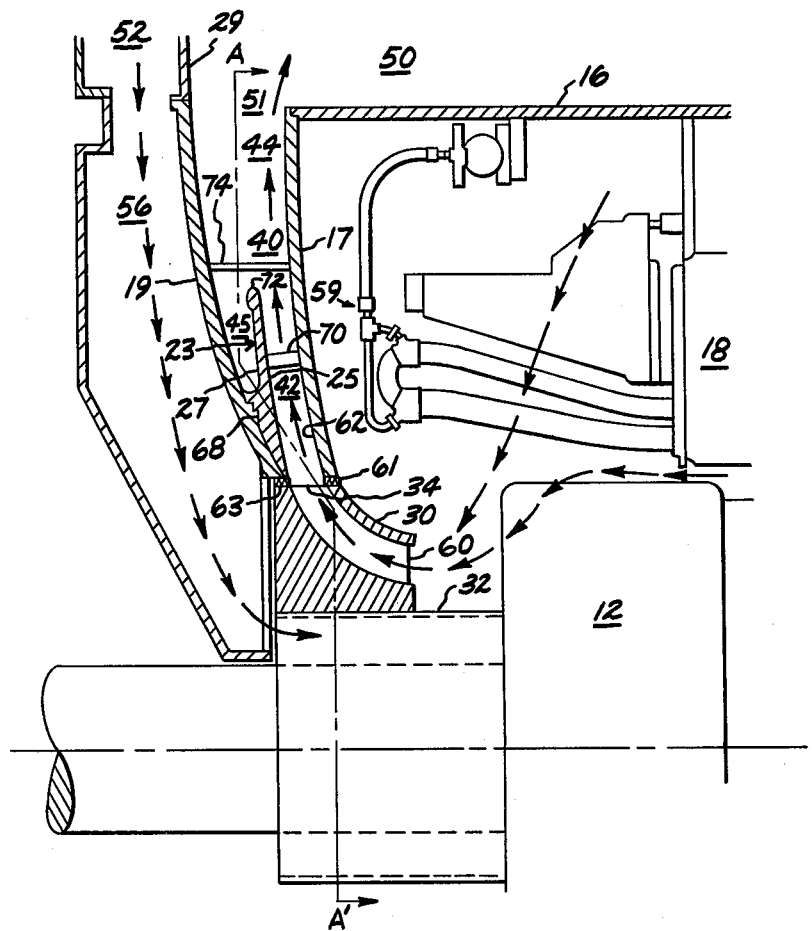
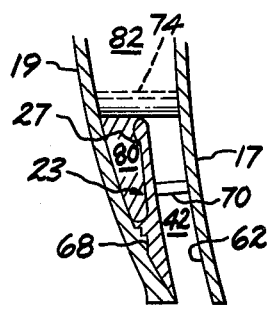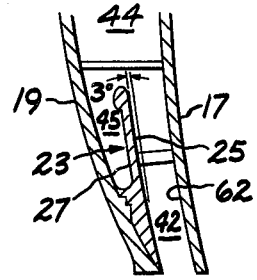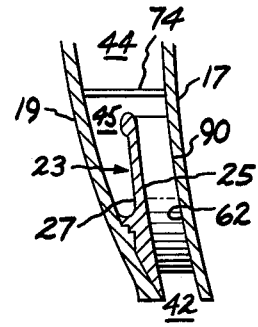

FAN DIFFUSER AND COLLECTOR COMBINATION FOR COOLING SYSTEMS IN DYNAMOELECTRIC MACHINES

BACKGROUND

This invention relates generally to cooling systems in gas cooled dynamoelectric machines, and particularly to a fan diffuser and collector combination as part of the cooling system.

In dynamoelectric machines, a great amount of heat is generated by the flow of currents through the field and armature windings and by eddy current heating in the stator core laminations. To protect the integrity of the materials of the windings and related supporting elements, a gas is utilized to cool the various components in the machine. In large dynamoelectric machines, the field windings are part of the rotor and the armature windings are part of the stator. The removal of heat from the various components in the dynamoelectric machine requires the gas to be moved through many relatively small passages in the rotor and the stator. Patents issued to Willyoung and Shartrand, U.S. Pat. Nos. 3,348,081 and 3,739,208, respectively, disclose the passages through the rotor and stator laminations as part of a gas cooled dynamoelectric machine. These two patents are incorporated herein by reference thereto.

One method of circulating the gas through the plurality of passages is accomplished by increasing the static pressure or pressure head of the gas at a some point in the cooling system. It is to be understood that there are other methods of circulating the gas through the cooling system of dynamoelectric machines however, this invention is directed towards the method of increasing the static pressure of the gas at a selected point in the cooling system.

Generally, the cooling system of the dynamoelectric machine will include some type of fan mechanism at one or the other or both ends of the machine. The fan is usually located on the rotor at that end. It is to be understood that the detailed description of the invention disclosed herein is directed to one fan, at one end of the dynamoelectric machine, and associated with a cooling system. Since it is common for dynamoelectric machines to include two fans and two interacting cooling systems at both ends of the machine, the invention herein normally would be utilized at both ends of the machine and in both cooling systems. For ease of explanation, the description below relates to only one cooling system which includes one fan at one end of a machine.

The fan circulates the gas through the cooling system by expelling the gas radially through an annular chamber at one end of the dynamoelectric machine. The annular chamber is formed by an inner and an outer end plate shield which are axially spaced apart and located within the frame wrapper. Generally, the frame wrapper surrounds both the stator and the rotor of the machine. The gas passes through an arcuate port in the frame wrapper towards a dome cooler, or means for cooling the gas, which is located atop the frame wrapper. Duct work from the dome cooler to the passages in the frame wrapper allow the gas to pass from the cooler and into the stator laminations as described above.

In a reverse flow cooling system for a dynamoelectric machine, the gas flow is split at the output of the dome cooler. A portion of the cooled gas is directed into the stator, and the remaining portion of the gas is channeled through an annulus duct work into the rotor passages. U.S. Pat. No. 3,739,208, issued to Shartrand, specifically discloses this type of cooling system and that disclosure is incorporated herein by reference thereto. After the gas has been introduced into the stator passages and the rotor passages, and the gas flows through both those elements, the gas eventually enters the air gap between the stator and the rotor and/or the interior space of the frame wrapper. The circulation of the gas is completed by the fan drawing the gas from the region of the stator and the rotor and expelling the gas back into the annular passage at one end of the dynamoelectric machine.

Since the gas must pass through many passages and be directed through and around the various components of the dynamoelectric machine, the primary force which circulates the gas through the machine is the gas' pressure head or its static pressure head. In otherwords, although the velocity of the gas may contribute to some circulation throughout the machine, the gas is moved primarily by its static pressure head. The gas which leaves the fan's exhaust port has an initial static pressure head and an initial velocity pressure head. The annular chamber, which circumferentially surrounds the exhaust port of the fan, does no work on the gas that flows through it. As is well known, Bernoulli's theorum provides that if no work is done on or by an incompressible fluid as it flows, the total head remains unchanged. In otherwords, if the velocity head of the gas changes from one point in the cooling system to another point then the pressure head of the gas must change inversely to the change in the velocity head of the gas. However, it should be recognized that the heating-up or cooling down of the gas is considered as work done on or by the gas, hence eddy streams within the gas flow caused by obstructions to the flow of gas may increase the temperature of the gas and effect the transformation of velocity head into static pressure head.

Although this theorum is relatively well known in the art, the application of this principle to the cooling systems of dynamoelectric machines is not easily accomplished. The annular chamber's axial size, radial dimensions, and its orientation with respect to the fan's exhaust and the other elements of the dynamoelectric machine severely limit the application of Bernoulli's theorum. The orientation of the annular chamber is affected by the end windings which protrude axially towards the fan from the stator of the machine, and the size of the chamber is affected by the frame wrapper which defines the radial extent of the machine, and by the machine's bearings supporting the rotor.

In prior art devices, the annular chamber primarily functioned as a passageway between the exhaust port of the fan and an arcuate port through the frame wrapper which leads to the intake duct for the dome cooler. In some prior art devices, the annular chamber has been a parallel walled passage from the fan exhaust to the arcuate port. Although these prior art devices do transform a portion of the gas' velocity head into static pressure head by virtue of the gas slowing down as it approaches the radial extent of the annular chamber as defined by the frame wrapper, the prior art devices have ignored the eddy streams created in the gas flow by the limited exit from the annular chamber through the arcuate port in the frame wrapper and other obstructions to the flow. These eddy streams cause the gas to heat up, therefore, work is done on the gas by the annular chamber in the form of changing the thermal energy of the gas and the static pressure head of the gas is not enhanced.

OBJECTS OF THE INVENTION

It is an object of this invention to provide for a more efficient circulation of gas in the cooling system of a gas cooled dynamoelectric machine.

It is another object of this invention to provide for a cooling system which includes means for transforming a portion of the velocity head of the gas into static pressure head.

It is an additional object of the present invention to provide for a diffuser channel in the inner radial portion of the annular chamber immediately downstream of the exhaust port of the fan.

It is a further object of the present invention to provide an outer radial portion of the annular chamber which collects the gas exiting the diffuser channel and minimizes eddy streams in the gas as it flows through the arcuate port in the frame wrapper.

It is another object of the present invention to provide for a disk located in the inner radial portion of the annular chamber which includes an inboard surface and an outboard surface opposite the inboard surface, wherein both surfaces of the disk are spaced away from the inner and outer end plate shields.

SUMMARY OF THE INVENTION

The present invention includes means for transforming the velocity head of a gas expelled by a fan, which is part of a cooling system for gas cooled dynamoelectric machine, into static pressure head. In one embodiment of the invention, the fan is located radially coextensive with an annular chamber defined by an inner and an outer end plate shields which are located at one end of the dynamoelectric machine. A disk is disposed within the radially inner portion of the annular chamber and has an inboard surface which is substantially parallel to an adjacent surface of one of the shields. The inboard surface and the adjacent surface define a diffuser channel therebetween which receives all of the gas expelled by the fan. The disk is foreshortened with respect to the frame wrapper, hence the gas flows out of the diffuser channel and into the outer radial portion of the annular chamber. The disk includes an outboard surface opposite the inboard surface which is spaced away from the other shield. The gas ultimately leaves the annular chamber through an arcuate port in the frame wrapper and is channeled through the intake duct of a cooling means located atop the frame wrapper.

BRIEF DESCRIPTION OF THE DRAWINGS

FIG. 2 illustrates a cooling system schematic of a reverse flow, gas cooled, dynamoelectric machine;

FIG. 3 is a blow up of the left end portion of FIG. 2 which illustrates in detail a mixed flow fan, and the diffuser channel and collector section of the annular chamber, i.e., the inner and outer radial portions of the annular chamber respectively;

FIG. 5 illustrates a view of the diffuser channel and the collector section taken along the broken line of B—B' in FIG. 4;

FIG. 6 illustrates a slightly diverging diffuser channel along a portion of the broken line B—B' in FIG. 4;

FIG. 8 illustrates a vaned diffuser channel generally viewed along a portion of the line C—C' in FIG. 7;

DETAILED DESCRIPTION OF THE DRAWINGS

Figure 1:
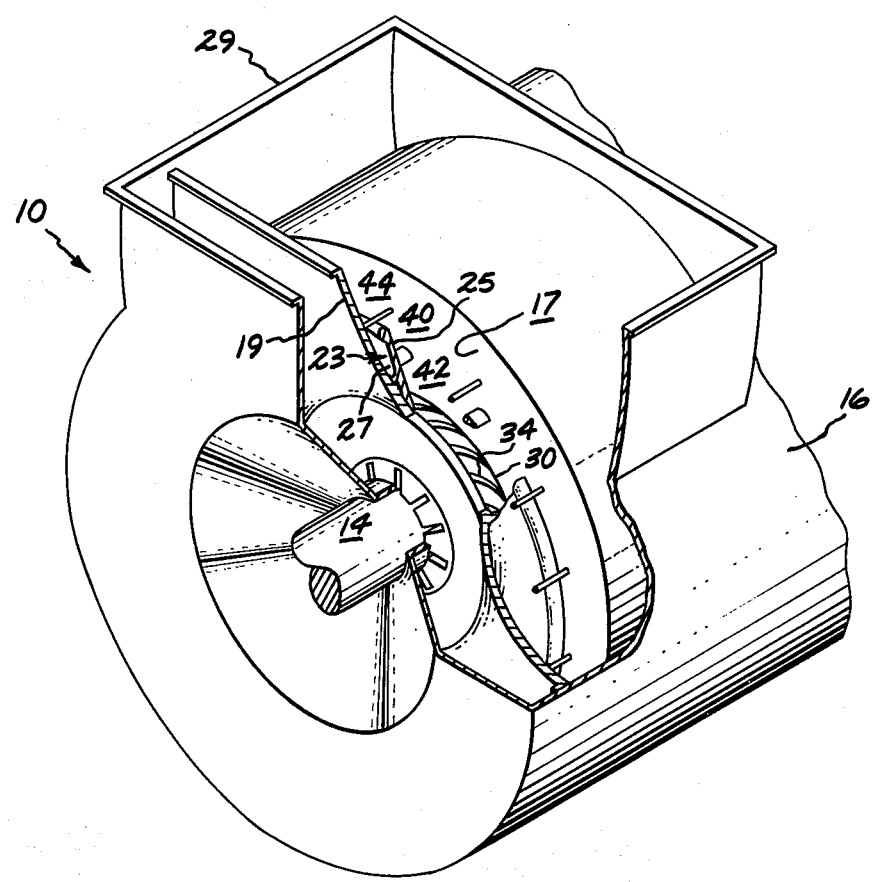
FIG. 1 illustrates a partially cutaway view of a dynamoelectric machine which includes the disk disposed in the annular chamber of the cooling system of the machine.

FIG. 1 illustrates a partially cutaway perspective view of the cooling system for a reverse flow, gas cooled dynamoelectric machine 10. Only one end of the dynamoelectric machine 10 is illustrated in FIG. 1. The outboard extension 14 of a rotor extends outward from machine 10. Inside a frame wrapper 16, not visible from FIG. 1's perspective, is a stator. FIG. 1 further illustrates an inner end wall shield 17 which is axially spaced apart from an outer end wall shield 19. An annular chamber 40 is defined between shield 17 and shield 19. A fan 30 is located radially coextensive with annular chamber 40 at one end of the rotor. The fan's exhaust port 34 is clearly illustrated in FIG. 1.

A disk 23 is located in the radially inner portion of annular chamber 40. Disk 23 is mounted to shield 19 proximate one axial side of fan exhaust port 34. Disk 23 has an inboard surface 25 which is substantially parallel to the adjacent surface portion of shield 17. A diffuser channel 42 is defined by the radially inner surface portion of shield 17 and inboard surface 25 and the channel receives substantially all of the gas flow expelled by fan 30. Disk 23 has an outboard surface 27 which is opposite inboard surface 25 and which is spaced away from shield 19. Radially beyond disk 23 is outer collector section 44 of annular chamber 40.

A clearer understanding of the annular chamber and its associated members can be gleaned from the cooling system schematic shown as FIG. 2. The numerals labeling various elements of the dynamoelectric machine in FIG. 1 are carried forward throughout all the Figures. An inboard portion 12 of the rotor is illustrated in FIG. 2. A stator 18 and rotor 12 are surrounded by frame wrapper 16. Means for cooling 26, which could be dome cooler well known in the art, is located atop frame wrapper 16. Cooling means 26 does not circumferentially surround frame wrapper 16 but is disposed along an arcuate portion of frame wrapper 16. The intake ductwork 29 of the cooling means is clearly illustrated as cutaway in FIG. 1 and is shown in FIG. 2. In this particular machine, fan 30 is a mixed flow fan which circulates gas throughout the cooling system as shown by the heavy arrowed lines in FIG. 2.

Generally, the gas is drawn from the region of stator 18 and rotor 12 and is expelled radially outward from exhaust port 34. The gas is expelled both radially and circumferentially into annular chamber 40, therefore, fan 30 is termed a mixed flow fan herein but the fan exhibits primarily radial flow characteristics with some axial flow characteristics as clearly illustrated in the figures. Intake ductwork 50 of cooling means 26 is associated with ductwork 29 and an arcuate port 51 in frame wrapper 16. Port 51 provides communication of the gas between annular chamber 40 and the cooling means. The gas is cooled therein and the output of cooling means 26 is split into an outboard flow path 52 and an inboard flow path 54. Flow path 52 is associated with an outer annulus ductwork which funnels the gas from path 52 radially inward towards through passage 56 to a slotted spindle 32 on the rotor. Thereafter, the gas flows through the relatively small passages in the rotor copper. Inboard flow path 54 passes through passages in frame wrapper 16 and other smaller passages in stator 18. The gas flow through both rotor 12 and stator 18 is then combined in the air gap of the dynamoelectric machine. Of course, not all the gas flows through stator 18 but some gas enters the interior spaces of frame wrapper 16 as illustrated by the arrows in FIG. 2.

Specifically, the gas is drawn into fan 30 axially near spindle 32. The static pressure head of the gas is increased by fan 30 and the velocity pressure head is also produced by fan's rotation. Hence, the gas expelled through fan exhaust port 34 has an initial static pressure head and an initial velocity pressure head. Substantially all of the gas expelled is received by diffuser channel 42. Diffuser channel 42 transforms a portion of the velocity pressure head into static pressure head thereby increasing the total static pressure head of the gas above the initial static pressure head. The gas leaving diffuser channel 42 enters the outer radial portion of the annular chamber or the collector section 44.

Collector section 44 collects the gas exiting diffuser channel 42 with minimal loss of the static pressure head of the gas and minimal disturbance of any residual velocity head, thereby minimizing any heating of the gas as a result of eddy streams created within the annular passage. Collector section 44 communicates with cooling means 26 only through arcuate port 51 in the frame wrapper 16. Hence, although collector section 44 circumferentially surrounds diffuser channel 42, the gas only exits collector section 44 through port 51. In other words, annular chamber 40 is limited radially by frame wrapper 16, therefore gas flow is directed into cooling means 26 with minimal disturbance by passing through the collector section.

As stated earlier, outboard surface 27 of disk 23 is spaced away from shield 19. An overhang collector section 45 is therefore defined by surface 27 and shield 19. The collector disclosed and claimed herein includes oth overhang collector section 45 and collector section 44. Overhang section 45 allows the gas to flow in the annular chamber without the introduction of substantial eddy streams therein. It is believed overhang section 45 increases the efficiency of the cooling system by allowing the gas to flow in the annular chamber without significant distrubances. To insure minimum eddy stream losses and heat gain, the thickness of disk 23 is minimized. Hence, overhang section 45 is maximized but not at the expense of diffuser channel 42 which must be substantially parallel to shield 17 and have a significant radial extent to transform a portion of the gas' velocity head into static pressure head.

Although fan diffusers are fairly well known, the space limitations inherent in dynamoelectric machines described herein severely limit the type, shape, and effectiveness of diffuser which can be incorporated into the machines. Specifically, the ratio of the radial distance between the rotor centerline and exhaust port 34, labeled $R_1$ in FIG. 2, and the radial distance between frame wrapper 16 and the centerline of the rotor, $R_2$, is large, on the order of $\frac{1}{2}$. Fan diffusers usually have radii ratios on the order of $\frac{1}{4}$ and lower. Therefore, incorporating a fan diffuser into dynamoelectric machines is severally limited by the ratio of the radii, herein $\frac{1}{2}$. It would not be economical to radially or axially expand frame wrapper 16. The axial space available for the diffuser channel and associated collector section is limited because of the bearing span of the outboard portion of the rotor. The configuration of diffuser channel 42, collector section 44 and overhang section 45 in annular chamber 40, as described herein, is relatively easy to incorporate, both structurally and monetarily, in dynamoelectric machines within the radial and axial space available without extensive modifications of the machine.

It has been calculated for a reverse flow, once through, four pole dynamoelectric machine, operating at 1800 RPM with a mixed flow fan and a diffuser channel occupying 22% of the total volume of the annular chamber, a collector section occupying 52% of the total volume and an overhang section occupying approximately 26% of the total volume, the static pressure of the gas exiting the annular chamber will be increased on the order of 16% over a machine without the fan diffuser and collector combination described herein. This estimated increase in static pressure should increase the flow of gas through the machine and hence improve the cooling system of the machine.

FIG. 3 is a blow up of the most significant portions of FIGS. 1 and 2 which include mixed flow fan 30 and annular chamber 40. Chamber 40 includes diffuser channel 42, collector section 44 and overhang section 45 as well as the items proximate the annular chamber. In a similar fashion to FIG. 2, the general direction of the flow of gas is indicated by arrows in FIG. 3.

Fan 30 includes intake port 60 which is proximate slotted spindle 32. Inner end plate shield 17 extends radially from one axial side of exhaust port 34 to frame wrapper 16. A sealing means is provided between the radially inner portion 62 of inner shield 17 and the side of exhaust port 34. The outer end plate shield 19 extends radially from the other axial end of exhaust port 34 to points radially coextensive with the frame wrapper 16 and also includes a sealing means. Diffuser section 42 is defined by inboard surface 25, and portion 62 of shield 17 wherein inboard surface 25 is substantially parallel to the adjacent surface of portion 62. Disk 23 is mounted by means 68 to shield 19.

Disk 23 is supported axially away from shield 17 by one of a plurality of airfoil supports 70. The supports are located in diffuser channel 42 at substantially evenly spaced intervals circumferentially about the rotor. Support 70 is a small airfoil which allows gas to flow around it without disturbing the flow and thereby minimizing any eddy streams which may occur in the gas flow as a result of the presence of the supports. The airfoil supports are oriented parallel to the stream lines of the gas flow to minimize the eddy streams in the gas flow.

Disk 23 has a radially outer end portion 72 which is preferably a bulb shape. Bulb shaped end 72 allows the gas which exits diffuser channel 42 to flow smoothly around disk 23 and into collector section 44 and overhang section 45 without significantly disturbing the streamlines of the flow. Disk 23 is foreshortened with respect to frame wrapper 16. In the illustrated machine, the disk is approximately one half the radial extent of the frame wrapper. A round support 74 axially spaces shield 17 from shield 19. Other items numbered in FIG. 3 have been discussed earlier with respect to FIGS. 1 and 2.

Figure 4:
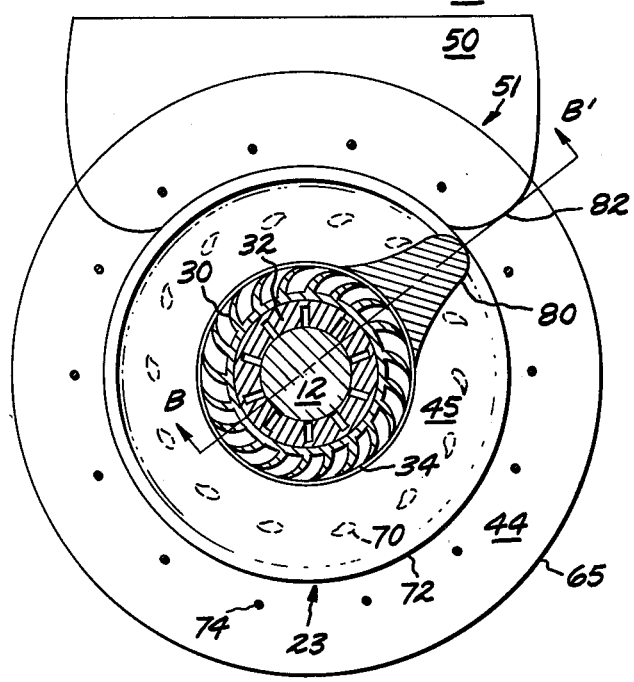
FIG. 4 illustrates a radial view of the invention generally viewed along broken line A—A' in FIG. 3, and shows the rotor, fan, diffuser channel and collector section of the annular chamber.

FIG. 4 is an axial view looking towards the rotor taken along broken line A—A' in FIG. 3. Line A—A' runs through collector section 44 and overhang section 45, through disk 23 and then radially through a portion of diffuser channel 42, fan 30, slotted spindle 32 and the rotor 14. The numerals designating these and other items in FIG. 4 are similarly designated FIGS. 1, 2 and 3. Specifically, viewing FIG. 4 from the centerline of the rotor radially outward, rotor 12 is illustrated, slotted spindle 32, fan 30 and the edge of exhaust port 34 is noted. Disk 23 is then shown. Airfoil support 70 and the other supports in the channel appear as dashed lines because the radial end view is taken from a plane axially cut through overhang section 45 which is the space between disk 23 and shield 19. The orientation of airfoil supports 70 are detailed in FIG. 4 as being parallel to the flow of gas exiting discharge port 34 of fan 30. End 72 of disk 23 is shown in FIG. 4. Round support 74 noted as is within collector section 44. The outer edge of frame wrapper 16 is also illustrated in FIG. 4. As clearly illustrated in FIG. 4, frame wrapper 16, as represented by its outer edge 65, radially encloses a substantial portion of collector section 44, and hence annular chamber 40. Since the gas flows substantially radially outward from fan 30 and cooling means 26 only communicates with the chamber through arcuate port 51, collector section 44 and overhang section 45 provide a volume of space within which the gas flows without substantially increasing eddy streams and creating back flow pressure in the gas.

Although the gas flows primarily radially through chamber 40, the gas does possess a circumferential velocity component. To prevent the gas which enters overhang section 45 from circulating completely around the annular chamber, a blocking means or back block 80 is disposed in the overhang section 45 at a position which would guide the gas flowing clockwise in FIG. 4 upwards towards cooler means 26. Similarly, a cutoff foil 82 or directing means completely blocks off the circular flow of gas in collector section 44. Cutoff foil 82 and back block 80 are down-stream of the arcuate port and hence both direct the gas upwards towards the intake of cooler means 26. Cutoff foil 82 is located at a circumferential position such that the flow of gas is directed radially upward towards the cooler means.

The diffuser channel and collector section is illustrated in FIG. 5 as seen from the view of dashed line B—B' in FIG. 4. FIG. 5 is a partial view of the diffuser channel 42 and collector section 44 taken through back block 80 and cutoff foil 82.

It is to be understood that the velocity head of the gas is transformed into static pressure head by a substantially parallel walled annular diffuser channel which is disposed in the annular chamber immediately downstream of the fan's exit. However, the diffuser channel could be slightly diverging as illustrated in FIG. 6. FIG. 6 shows a three degree divergence from the throat of channel 42 to the exit of that channel. For purposes of this invention, a divergence on the order of 3 degrees is considered substantially parallel.

Figure 7:
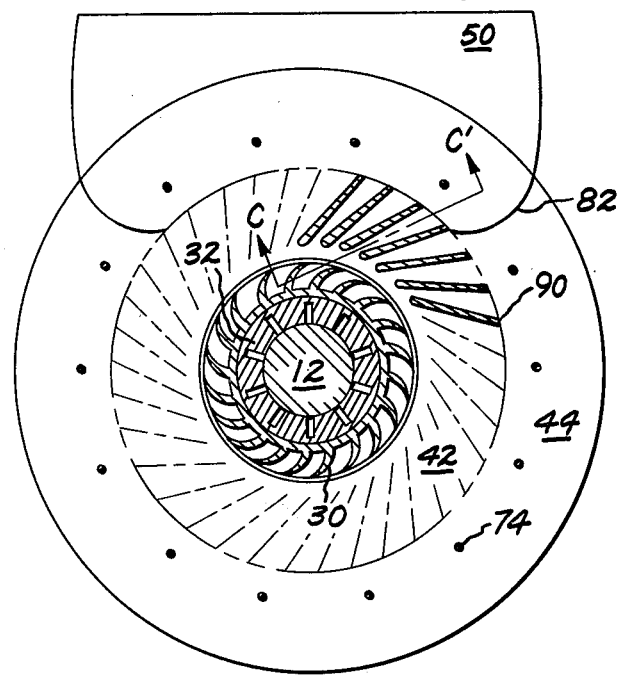
FIG. 7 shows the vaned diffuser channel from a radial view similar to the view in FIG. 4 but extending through the entire diffuser channel.

The diffuser channel 42 could include a plurality of vanes 90 oriented such that the vanes' centerline are substantially parallel to the stream lines of the gas flowing through channel 42 as illustrated in FIG. 7. FIG. 8 illustrates the location of a vane in diffuser channel 42. FIG. 7 illustrates a complete end view of the vaned diffuser channel and shows the orientation of the vanes' centerlines with respect to vane 90. The end view of FIG. 7 runs through collector section 44, diffuser channel 42 as well as fan 30, slotted spindle 32 and rotor 12. For clarity only vane 90 is illustrated in its entirety. However, the centerlines of the remaining vanes are illustrated in FIG. 7. The plurality of vanes may assist in transforming the velocity head of the gas flowing through diffuser channel 42 into static pressure head at the exit of that channel.

Figure 9:
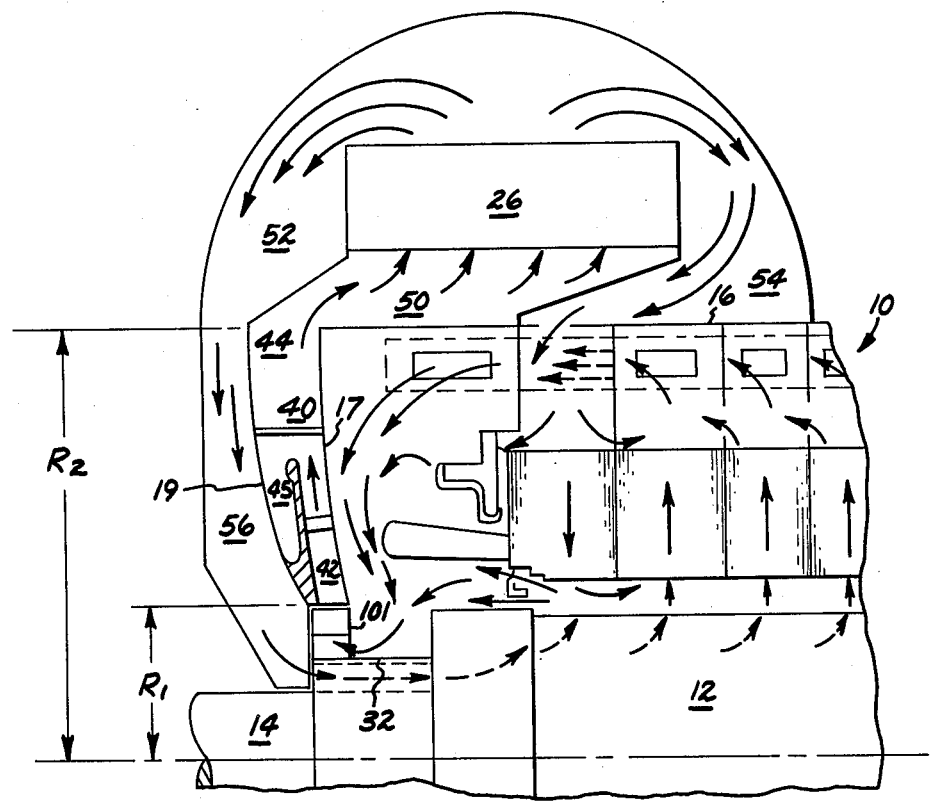
FIG. 9 illustrates a cooling system schematic for a reverse flow, gas cooled dynamoelectric machine which utilizes a purely radial flow fan, and includes a diffuser channel and a collector section as part of the annular chamber.

FIG. 9 is a schematic for a cooling system which includes a radial flow fan 101 as part of a reverse flow, dynamoelectric machine. Fan 101 is affixed to spindle 32 of the rotor and draws gas from the interior of frame wrapper 16 into annular chamber 40. As in earlier illustrations, similar numbers denote similar components of this dynamoelectric machine. The operation of the diffuser channel, collector section and overhang section is substantially the same with radial flow fan 101 as is the operation of mixed flow fan described hereinabove.

It is to be understood that a fan diffuser could be utilized at both ends of the dynamoelectric machine to increase the efficiency of a dual cooling system. It is also to be noted that the overhang section 45 could be axially opposite that as described herein. In otherwords, shield 19 could define diffuser channel 42 in combination with disk 23. In that particular case, disk 23 would be mounted to shield 17 and overhang section 45 would be defined between disk 23 and shield 17.

A person ordinarily skilled in the art could practice the invention with the principles described herein by utilizing a diffuser channel as part of the annular chamber in combination with a collector. The specific configuration of the disk, diffuser channel supports, cooler location, or the general configuration of the annular chamber is only illustrative of a fan diffuser and associated collector and overhang sections described and claimed herein. For example, a person of ordinary skill in the art could practice the present invention by having a parallel walled diffuser channel defined by a disk, an overhang section defined by the outboard surface 27 of the disk and by having supports extending between shield 19 and outboard surface 27 rather than the support shown in the diffuser channel. The disk could be an integral part of shield 19 or shield 17 rather than a separate structure as illustrated herein. Also, square supports and a squared off disk end would transform the velocity head into static pressure head, however the efficiency of the fan diffuser and associated collector would not be as great as calculated hereinabove.

It is estimated that the static pressure head recovered from the gas flow could be improved on the order of 15 to 35 percent with a fan diffuser assembly as described herein.

The pending claims are intended to cover all of the above modifications and other apparatus which fall within the true spirit and scope of the present invention.

We claim:

1. A fan diffuser and collector combination as part of a cooling system for a gas cooled dynamoelectric machine, said machine having a stator and a rotor both being surrounded by a frame wrapper, said machine including an inner end plate shield and an outer end plate shield axially spaced apart and defining an annular chamber there between and located within said frame wrapper both at one end of said machine, said cooling system including a fan located on the rotor radially coextensive with the annular chamber defined by said inner and outer shields, said fan having means to circulate the gas through said cooling system by expelling said gas radially through said annular chamber, said frame wrapper having an arcuate port therethrough which allows said gas to pass from said annular chamber to means for cooling located atop said frame wrapper and to the remaining elements of said cooling system, said fan diffuser and collector combination comprising:

a disk having a radially extensive edge, said disk located within the radially inner portion of said annular chamber, being foreshortened with respect to said frame wrapper, and having an inboard surface which is substantially parallel to an adjacent surface of one of said shields, said inboard surface and said adjacent surface defining a diffuser channel therebetween which receives substantially all of the gas expelled by said fan, and said channel transforming a portion of the gas' velocity into static pressure; and a plurality of supports located in said diffuser channel at substantially evenly spaced intervals circumferentially about said rotor, and said supports maintaining the parallel spacing between said inboard surface of said disk and said one shield.

2. A fan diffuser as recited in claim 1 above wherein said disk is mounted to the other one of said shields proximate the fan's exhaust port, said exhaust port situated at the radially inner portion of said annular chamber, and said disk includes an outboard surface opposite said inboard surface which is spaced away from said other shield; and said supports are airfoil shaped and said airfoil shaped supports are oriented parallel to the stream lines of the gas flow through said diffuser channel.

3. A fan diffuser as recited in claim 2 above wherein the radially extensive edge of said disk is continuously curved.

4. A fan diffuser as recited in claim 3 above wherein said radially extensive edge has a bulb shaped cross-sectional configuration.

5. A fan diffuser as recited in claims 1 or 2 wherein the gas flow through said annular chamber has a circumferential velocity component in addition to its radial flow, and said fan diffuser further comprising means for directing the gas into said arcuate port of said frame wrapper, said directing means completely blocking any circular flow of gas in the radially outer portion of said annular chamber, and said directing means proximate the down-stream side of said arcuate port.

6. A fan diffuser as recited in claim 5 above further comprising means for blocking any circular flow of gas in the space between said outboard surface and said other shield, and said blocking means guiding the gas towards said directing means.

7. A fan diffuser as recited in claims 1 or 2 further comprising a plurality of spaced apart vanes located in said diffuser channel, and said vanes being radially oriented in said diffuser channel substantially parallel to the streamlines of the gas expelled by said fan.

8. In combination with a cooling system for a gas cooled dynamoelectric machine, said machine having a stator and a rotor both being surrounded by a frame wrapper, said machine including an inner end plate shield and an outer end plate shield axially spaced apart and defining an annular chamber there between and located within said frame wrapper both at one end of said machine, said cooling system including a fan located on the rotor coextensive with the annular chamber defined by said inner and outer shields, said fan having means to circulate the gas through said cooling system by expelling said gas radially through said annular chamber, said frame wrapper having an arcuate port therethrough which allows said gas to pass from said annular chamber to a means for cooling located atop said frame wrapper and to pass through the remaining elements of said cooling system, a means for transforming the velocity of said gas expelled by said fan into a static pressure head, said means for transmitting comprising:

a disk having a radially extensive edge, said disk located within the radially inner portion of said annular chamber, being foreshortened with respect to said frame wrapper, and having an inboard surface which is substantially parallel to an adjacent surface of one of said shields, said inboard surface and said adjacent surface defining a diffuser channel therebetween which receives substantially all of the gas expelled by said fan, and said channel transforming a portion of the gas' velocity into static pressure; and a plurality of airfoil shaped supports located in said diffuser channel at substantially evenly spaced intervals circumferentially about said rotor, said airfoil supports maintaining the parallel spacing between said inboard surface of said disk and said one shield, and said airfoil supports being oriented parallel to the streamlines of the gas flow through said diffuser channel.

9. A combination as recited in claim 8 above wherein said disk is mounted to the other one of said shields proximate the fan's exhaust port and said disk includes an outboard surface opposite said inboard surface which is spaced away from said other one of said shields.

10. A combination as recited in claim 9 above wherein the radially extensive edge of said disk is continuously curved.

11. In combination with a cooling system for a gas cooled dynamoelectric machine, said machine having a stator and a rotor both being surrounded by a frame wrapper, said machine including an inner end plate shield and an outer end plate shield axially spaced apart and defining an annular chamber there between and located within said frame wrapper both at one end of said machine, said cooling system including a fan located on the rotor radially coextensive with the annular chamber defined by said inner and outer shields, said fan having means to circulate the gas through said cooling system by expelling said gas radially through said annular chamber, said frame wrapper having an arcuate port therethrough which allows said gas to pass from said annular chamber to means for cooling located atop said frame wrapper and to the remaining elements of said cooling system, means for transforming the velocity of said gas expelled by said fan into a static pressure head, said means for transmitting comprising:

a disk having a radially extensive edge, said disk located within the radially inner portion of said annular chamber, being foreshortened with respect to said frame wrapper, and having an inboard surface which is substantially parallel to an adjacent surface of said inner end plate shield said inboard surface and said adjacent surface defining a diffuser channel therebetween which receives substantially all of the gas expelled by said fan, and said channel transforming a portion of the gas' velocity into static pressure, said disk being mounted to the outer end plate shield proximate the fan's exhaust port said exhaust port situated at the radially inner portion of said annular chamber, and said disk including an outboard surface opposite said inboard surface which is spaced away from said outer end plate shield; and a plurality of supports extending between said outer end plate shield and said outboard surface of said disk, and said supports maintaining the parallel spacing between said inboard surface of said disk and said inner end plate shield.

12. A fan diffuser as recited in claim 11 above wherein the radially extensive edge of said disk is continuously curved.

13. A fan diffuser as recited in claim 12 above wherein said radially extensive edge has a bulb shaped cross-sectional configuration.

* * * * *